Sept. 22, 1964  G. I. DOERING  3,150,213
REGULATION OF EXTRUDER SYSTEMS
Filed Dec. 29, 1960
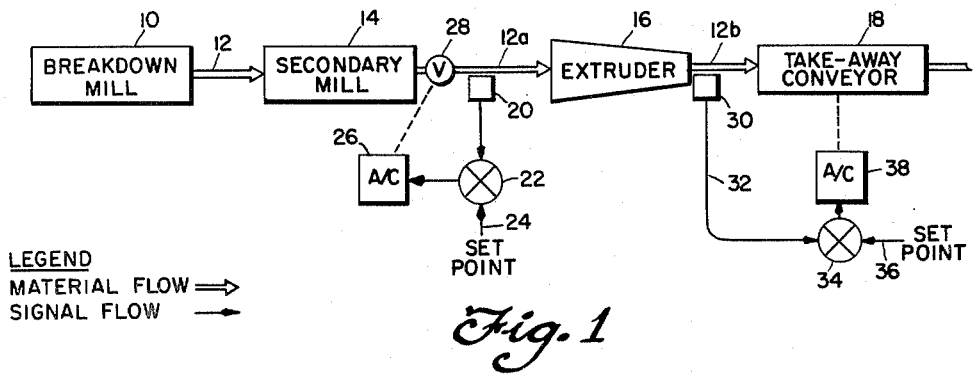
LEGEND
MATERIAL FLOW ⇒
SIGNAL FLOW ⟶
Fig. 1
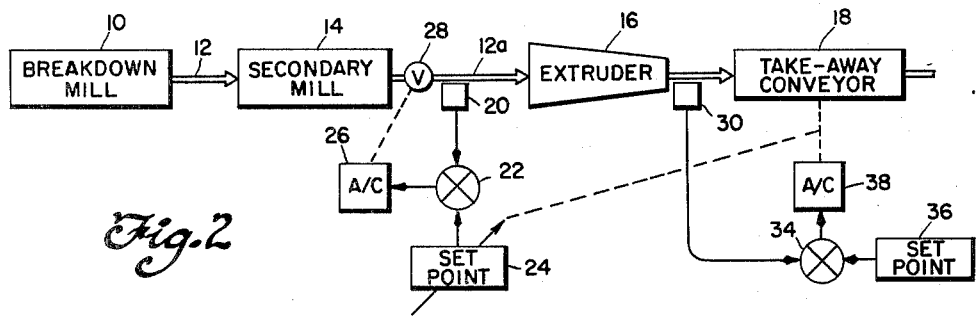
Fig. 2
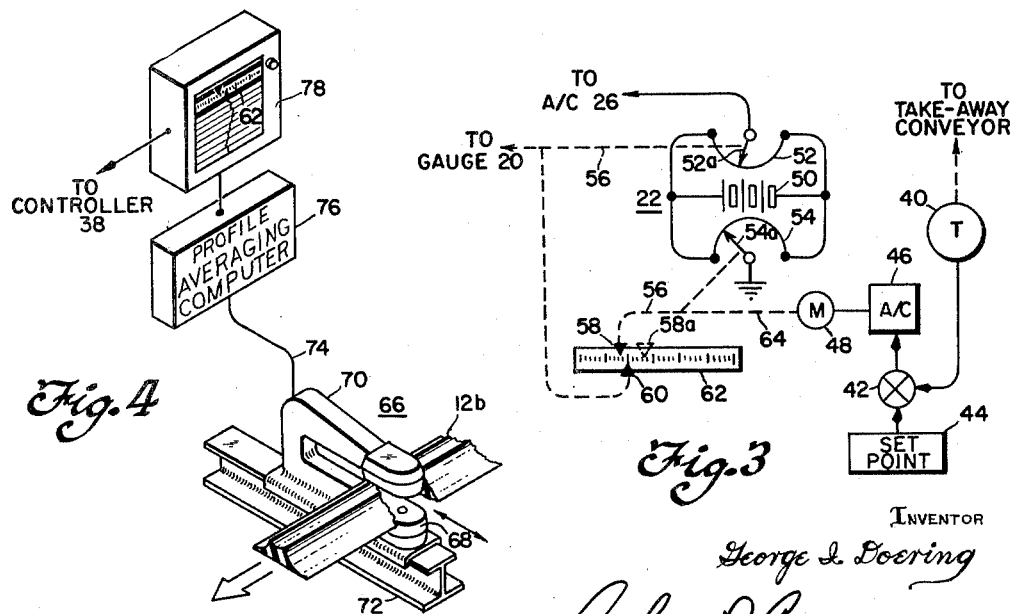
Fig. 4
Fig. 3
INVENTOR
George I. Doering
By Anthony D. Cennamo

United States Patent Office 3,150,213
Patented Sept. 22, 1964

3,150,213
REGULATION OF EXTRUDER SYSTEMS
George I. Doering, Columbus, Ohio, assignor to Industrial Nucleonics Corporation, a corporation of Ohio
Filed Dec. 29, 1960, Ser. No. 79,198
6 Claims. (Cl. 264—40)

This invention relates generally to extruding processes and more particularly to a system for automatically controlling tread extruding processes to provide a product of uniform weight per unit length.

In the conventional operation of a tread extruding process, a breakdown mill feeds material to a secondary mill. A strip is taken from the secondary mill and fed to the extruder. Usually, a bank of material is maintained in the secondary mill. The extruder produces a continuous sheet having a predetermined cross-machine profile in accordance with the die used. A takeaway conveyor transports the extruded sheet from the extruding orifice to a cutter which severs the sheet into pieces of equal length.

It has been found that the product manufactured by the conventional extruding process has not been uniform, that is, the weight per unit length has varied considerably. This variation in weight is due primarily to variations in the mass flow of the strip fed to the extruder; and secondarily, to slight variations in the operating conditions of the extruder. Other variables such as composition inconsistencies of the material may indirectly affect the uniformity of the extruded product.

To overcome the attendant disadvantages of the conventional extruding process, the present invention provides a control system for controlling the mass flow of the strip to the extruder in accordance with the mass flow measurements of a first gauge located immediately adjacent the output of the secondary mill. In addition the present invention provides another control loop for adjusting the take-away speed of the extruded sheet in accordance with the mass per unit length measurement of the extruded sheet. It further provides means for coupling both the strip control loop and the sheet control loop together to provide an improved synergetic overall control of the tread extruding operation. Whenever the take-away speed is increased or decreased by the sheet control loop, the feed rate to the extruder is respectively decreased or increased a proportional amount.

Accordingly, it is a primary object of the present invention to provide an improved control system for a tread extruding process.

It is another object of the present invention to provide a control system which minimizes the amount of material extruded with excess variance.

It is also an object of the present invention to provide a control system which is completely automatic in operation.

It is yet another object of the present invention to provide a control system for an extruding process to provide a more uniform product at the highest possible production rate.

It is an additional object of the present invention to provide a control system which is readily adaptable to industrial processes already in existence.

These and other objects and advantages will become more apparent from the following detailed description taken in conjunction with the drawings, in which:

FIG. 1 is a general diagrammatic showing of an industrial extruding process employing the dual loop control system of the prevent invention;

FIG. 2 is another diagrammatic view combining the dual control loops of FIG. 1;

FIG. 3 is a diagrammatic view partly schematic circuit useful in explaining the method of combining the aforesaid control loops; and FIG. 4 is a perspective view partly diagrammatic of a traversing gauge useful for measuring the output of the illustrated process.

Referring to the drawings and specifically to FIG. 1, a breakdown mill 10 transmits materials 12 to a secondary mill 14. A strip 12a issues from the secondary mill 14 and is fed to an extruder 16. From the output of the extruder a sheet 12b emerges on a take-away conveyor 18. It should be noted that there may be many variations in the construction of the extruding process, e.g., the breakdown and secondary mills may be different or combined and tandem extruders may be used. Nonetheless, the application of the principles of the present invention to these processes will be apparent from the description of the illustrated embodiment.

A material bank is created in the secondary mill 14 from which material for the strip 12a may be taken. For optimum operation, the banks should not vary beyond predetermined limits. The uniformity of the strip 12a critically affects the output of the extruder 16. Best results are obtained when the strip feed 12a to the extruder is the most uniform possible. Most of the long term variations in the weight per unit length characteristic of the extruded sheet 12b may be eliminated by providing a strip 12a whose mass per unit time is equal to the desired mass per unit time of strip 12b.

In accordance with the present invention a device 20 for measuring the mass flow of the strip 12a is positioned between the secondary mill 14 and the extruder 16. Since the width of strip 12a is maintained substantially constant and the speed of travel is fixed, a weight per unit area measurement of the strip 12a will provide a signal proportional to mass flow. To minimize the transportation lag of the control system, the measuring device 20 is located as close as physically possible to the output of the secondary mill 14. Strip mass flow signals are transmitted to a device 22 which compares the output of the measuring device 20 with a set point signal on line 24 indicative of a desired mass flow of strip 12a. Error signals from the comparator device 22 comprise the input to an automatic controller 26. Controller 26 may be of the proportional or reset type. A typical reset controller applicable at 26 may be found in U.S. Letters Patent No. 2,895,888 issued to Donald E. Varner for Electrolytic Plating Apparatus and Process. Controller 26 adjusts a valve 28 to control the mass flow of strip 12a into the extruder 16. The secondary mill 14 may include a pair of rolls spaced a predetermined distance apart, one of which carries a blanket of material. Valve 28 may comprise either a pair of spaced knives which are centrally located across the width of the blanket roll to cut the strip 12a therefrom or means for adjusting the spacing between the rolls to vary the thickness of strip 12a. However, if the width of the strip 12a is controlled, it is apparent that a mass per unit area measurement of the strip 12a will not correlate to mass flow unless a strip width monitoring device is used. This may be a device such as marketed and sold by Askania Regulator Company which may be incorporated in the gauge 20 to modify the mass per unit area functional signal.

The sheet control loop includes another device 30 for measuring the mass per unit length of extruded sheet. Signals from the measuring device 30 are transmitted over line 32 to a comparator 34 together with a mass per unit length set point signal on line 36. The error signal output of comparator 34 is transmitted to another controller 38 which adjusts the speed of the take-away conveyor in accordance with the derived error.

The operation of the invention proceeds as follows: Measuring device 20 and controller 26 cooperate to maintain a strip 12a at the target mass flow set in the control loop at 24. The valve 28 is opened and closed by the controller 26 whenever the mass flow of the strip 12a falls below or rises above the desired value. This control loop adequately compensates the process for long term variations in the controllable variable. Short term variations are removed by the sheet loop control system. Whenever the measuring device 30 detects an increase in the mass per unit length of the extruded sheet 12b, controller 38 speeds up conveyor 18 until the mass per unit length is that desired. Of course, a sudden decrease in the mass per unit length causes a reverse adjustment of the take-away conveyor speed.

The two control loops described hereinabove may be joined as shown in FIGS. 2 and 3 to provide a unitary system capable of further reducing the variance of extruded sheet. Referring now to FIGS. 2 and 3, a change in conveyor speed is made to compensate for a change in the weight per unit length of extruded sheet. And, presumably this is the result of a change in the strip mass flow into the extruder. However, it is also desirable to run the take-away conveyor 18 about some average speed to maximize throughput and eliminate overstretching of the sheet 12b. To achieve these goals, a speed sensing and set-point controller is constructed as shown in FIG. 3. A tachometer 40 is geared to the conveyor 18 and senses the speed thereof. The conveyor speed signal is compared at 42 with the desired conveyor speed set in at 44. Any difference between the two signals activates an automatic controller 46. A reversible servo motor 48 is actuated in turn by the controller 46.

The comparator 22 may comprise a typical bridge network including a source of potential 50 and parallel-connected slide-wire potentiometers 52 and 54. The position of arm 52a of potentiometer 52 is movable in accordance with the strip mass flow signal generated by measuring device 20, the mechanical connection being indicated by the dotted line 56. Arm 54a of the target potentiometer 54 is adjustable and determines the point across the slidewire 52 at which a bridge balance condition obtains. The slidewire arms 52a and 54a may be respectively connected to indicators 58 and 60 registering strip mass flow in lbs. per minute, e.g., on a dial 62. The slidewire arm 54a is mechanically connected as indicated by the dotted line 64 to the servo motor 48.

In the operation of this embodiment, consider the case when the conveyor is running at the desired speed and the controller 38 decreases the speed of conveyor 18 in response to a signal from measuring device 30. The tachometer output voltage drops and an error signal applied to controller 46 causes the target to be increased to a new value indicated at 58a. The controller 26 operates about this new set point. The average strip mass flow to the extruder is increased accordingly. The effect of the increase is ultimately detected at 30. Thereupon the speed of conveyor 18 is increased to the original desired value, the weight per unit length of the extruded sheet 12b remaining substantially constant in the interim. An increase in mass per unit length of the sheet detected at 30 reverses the direction of the mass flow target of controller 26 so that the average strip mass flow is less.

Referring to FIG. 4, the measuring device employed at 30 may be a radiation gauge 66. The gauge 66 may further be preferably of the transmission type having a lower arm 68 and an upper arm 70 joined together at one end and slidably mounted upon a rail 72. The arms respectively carry radiation source and detector elements and suitable preamplifier circuitry. The gauge is adapted to scan the width of the traveling tread 12b and to provide on line 74 a signal proportional to the thickness of the tread 12b. Since the tread varies in cross-section, the signal on line 74 is integrated by a profile averaging computer 76. The mass per unit length of tread may be read out on a chart recorder 78 connected to the output of the profile averaging computer 76. The construction of computer 76 as well as the scanning mechanism for the gauge 66 may be found in an article entitled "Computers Team With Nuclear Gauges to Control a Paper Saturating Process" appearing in the December 1955 issue of Control Engineering. This control system is manufactured and marketed by Industrial Nucleonics Corporation, Columbus, Ohio. The corporation has issued a bulletin "AccuRay Data and Control Systems for the Pulp and Paper Industry" which also contains adequate description of the construction of computer 76 and circuitry associated therewith.

Although there is shown a preferred embodiment of the present invention, modifications may be had without departing from the true scope and spirit of the invention.

What is claimed is:

1. The method of controlling the weight per unit length of the product of an extruding process having a source of material to be extruded, adjustable means for feeding said material to an extruding element and means for conveying said extruded product away from said extruding element at an adjustable rate comprising the steps of measuring the mass flow of said material entering said extruding element, deriving a set point for said mass flow, comparing said measured mass flow with said set point, adjusting said rate of feed of said material to said extruding element whenever said measured mass flow deviates from said set point, measuring the weight per unit length of said product, deriving a set point for said weight per unit length of said product, comparing said measured weight per unit length with said set point therefor, adjusting said rate of take-away of said product from said extruding element whenever said measured weight per unit length of said product deviates from said set point therefor, and adjusting said set point for said mass flow of material into said extruding element in accordance with said take-away rate.

2. The method of controlling the weight per unit length of the product of an extruding process having a source of material to be extruded, adjustable means for feeding said material to an extruding element and means for conveying said extruded product away from said extruding element at an adjustable rate comprising the steps of measuring the mass flow of said material entering said extruding element, deriving a set point for said mass flow, comparing said measured mass flow with said set point, adjusting said rate of feed of said material to said extruding element whenever said measured mass flow deviates from said set point, measuring the weight per unit length of said product, deriving a set point for said weight per unit length of said product, comparing said measured weight per unit length of said product with said set point therefor, adjusting said rate of take-away of said product from said extruding element whenever said measured weight per unit length of said product deviates from said set point therefor, measuring the take-away rate of said product, deriving a set point for said take-away rate, comparing said measured take-away rate with said set point therefor, and adjusting said set point for said mass flow of said material into said extruding element whenever said measured take-away rate deviates from said set point therefor.

3. Apparatus for controlling the weight per unit length of the product of an extruding process having a source of material to be extruded, adjustable means for feeding said material to an extruding element and means for conveying said extruded product away from said extruding element at an adjustable take-away rate comprising means for measuring the mass flow of said material entering said extruding element and for generating a signal proportional to said mass flow, first circuit means for deriving a set point signal for said mass flow, means for comparing said generated mass flow signal with said set point signal, means responsive to said comparing means for adjusting said rate of feed of said material to said extruding element whenever said measured mass flow signal deviates from said set point signal, gauging means for measuring the weight per unit length of said product and for generating a signal proportional to said weight per unit length, second circuit means for deriving a set point signal for said weight per unit length of said product, means for comparing said generated weight per unit length signal with said weight per unit length set point signal, means responsive to said weight per unit length signal comparing means for adjusting said rate of take-away of said product from said extruding element whenever said generated weight per unit length signal deviates from said weight per unit length set point signal, and means responsive to said take-away rate for adjusting said first circuit means for deriving said set point signal for said mass flow of material into said extruding element in accordance with said take-away rate.

4. Apparatus for controlling the weight per unit length of the product of an extruding process having a source of material to be extruded, adjustable means for feeding said material to an extruding element and means for conveying said extruded product away from said extruding element at an adjustable take-away rate comprising means for measuring the mass flow of said material entering said extruding element and for generating a signal proportional to said mass flow, first circuit means for deriving a set point signal for said mass flow, means for comparing said generated mass flow signal with said set point signal, means responsive to said mass flow signal comparing means for adjusting said rate of feed of said material to said extruding element whenever said generated mass flow signal deviates from said set point signal, gauging means for measuring the weight per unit length of said product and for generating a signal proportional to said weight per unit length, second circuit means for deriving a set point signal for said weight per unit length of said product, means for comparing said generated weight per unit length signal with said weight per unit length set point signal, means responsive to said weight per unit length signal comparing means for adjusting said rate of take-away of said product from said extruding element whenever said generated weight per unit length signal deviates from said weight per unit length set point signal, means for generating a signal proportional to the take-away rate of said product, third circuit means for deriving a set point signal for said take-away rate, means for comparing said generated take-away rate signal with said take-away rate set point signal, and means responsive to said take-away rate signal comparing means for adjusting said first circuit means for deriving said set point signal for said mass flow of said material into said extruding element whenever said measured take-away rate signal deviates from said take-away rate set point signal.

5. Apparatus as set forth in claim 4 in which said gauging means comprises a radiation gauge for scanning across the width of said product to develop a signal proportional to the thickness of said product, means for integrating said signal, and means for indicating said integrated signal.

6. Apparatus as set forth in claim 4 in which said adjusting means for said mass flow set point comprises a pair of parallel-connected slidewire potentiometers having a source of potential applied across said parallel connection, an arm on one of said slidewires movable thereacross in accordance with the mass flow of said material to said extruding element, a movable arm on the other of said slidewires, and reversible motor means connected to said arm.

References Cited in the file of this patent

UNITED STATES PATENTS

| | | |
|---|---|---|
| 1,594,845 | Myers | Aug. 3, 1926 |
| 2,051,781 | Brown | Aug. 18, 1936 |
| 2,156,895 | Godat | May 2, 1939 |
| 2,289,933 | Rankin | July 14, 1942 |
| 2,645,447 | Clark et al. | July 14, 1953 |
| 2,726,922 | Merrill et al. | Dec. 13, 1955 |
| 3,000,438 | Alexander | Sept. 19, 1961 |
| 3,006,225 | Mamas | Oct. 31, 1961 |
| 3,015,129 | Hays et al. | Jan. 2, 1962 |